(12) United States Patent
Huynh

(10) Patent No.: US 9,679,267 B2
(45) Date of Patent: *Jun. 13, 2017

(54) HIGH PERFORMANCE MAP EDITOR FOR BUSINESS ANALYSTS

(71) Applicant: International Business Machines Corporation, Armonk, NY (US)

(72) Inventor: Kien K. Huynh, Thornhill (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 99 days.

This patent is subject to a terminal disclaimer.

(21) Appl. No.: 14/688,675

(22) Filed: Apr. 16, 2015

(65) Prior Publication Data

US 2015/0220858 A1    Aug. 6, 2015

Related U.S. Application Data

(63) Continuation of application No. 12/895,906, filed on Oct. 1, 2010, now Pat. No. 9,043,366.

(51) Int. Cl.
  *G06F 7/00* (2006.01)
  *G06F 17/30* (2006.01)
  *G06Q 10/06* (2012.01)

(52) U.S. Cl.
  CPC ..... *G06Q 10/067* (2013.01); *G06F 17/30575* (2013.01); *G06F 17/30908* (2013.01); *G06F 17/30911* (2013.01); *Y10S 707/99943* (2013.01)

(58) Field of Classification Search
  CPC .............. G06F 17/30; G06F 17/30908; G06F 17/30911; G06F 17/30575; G06Q 10/06; G06Q 10/067; Y10S 707/99943
  See application file for complete search history.

(56) References Cited

U.S. PATENT DOCUMENTS 7,478,079 B2    1/2009  Robertson et al.
8,260,587 B2 *  9/2012  Sanchez .............. G06F 17/5009
                                                           703/2

(Continued)

OTHER PUBLICATIONS

United States Patent and Trademark Office, Office Action for U.S. Appl. No. 12/895,906, Jun. 4, 2012, pp. 1-15, Alexandria, VA, USA.

(Continued)

*Primary Examiner* — Azam Cheema
(74) *Attorney, Agent, or Firm* — Lee Law, PLLC; Christopher B. Lee

(57) ABSTRACT

At least one model synchronization map table is built that facilitates navigation between elements of business objects of a business object model and corresponding elements of an extensible markup language (XML) schema definition-based (XSD-based) model. The XSD-based model includes at least one XML schema and is generated from the business object model. The business object model and the XSD-based model are displayed in a dual-view editor. The dual-view editor enables a user to toggle between and independently edit the business object model and the XSD-based model. In response to independent edits made to one of the XSD-based model and the business object model within the dual-view editor, the elements of the business object model are automatically synchronized with the corresponding elements of the XSD-based model using the at least one model synchronization map table.

17 Claims, 7 Drawing Sheets

(56) References Cited

U.S. PATENT DOCUMENTS

| | | |
|---|---|---|
| 2003/0018832 A1 | 1/2003 | Amirisetty et al. |
| 2003/0149934 A1 | 8/2003 | Worden |
| 2004/0205562 A1 | 10/2004 | Rozek et al. |
| 2005/0132276 A1* | 6/2005 | Panditharadhya ..... G06Q 10/10 715/230 |
| 2007/0174420 A1 | 7/2007 | Khusial et al. |
| 2008/0052308 A1 | 2/2008 | Zhang |
| 2009/0164497 A1* | 6/2009 | Steinmaier ........ G06F 17/30292 |
| 2010/0211412 A1 | 8/2010 | Tholl et al. |
| 2010/0257441 A1 | 10/2010 | Stuhec |
| 2011/0066809 A1 | 3/2011 | Kinoshita |

OTHER PUBLICATIONS

United States Patent and Trademark Office, Office Action for U.S. Appl. No. 12/895,906, Aug. 29, 2013, pp. 1-11, Alexandria, VA, USA.

United States Patent and Trademark Office, Office Action for U.S. Appl. No. 12/895,906, Feb. 28, 2014, pp. 1-15, Alexandria, VA, USA.

United States Patent and Trademark Office, Office Action for U.S. Appl. No. 12/895,906, Aug. 15, 2014, pp. 1-18, Alexandria, VA, USA.

United States Patent and Trademark Office, Notice of Allowance for Application No. 12/895,906, Jan. 20, 2015, pp. 1-20, Alexandria, VA, USA.

\* cited by examiner

```
buildMapTable (businessitem, xsdType) {
        types is a collection of business items that haven't been processed
        add businessItem to types
        while (types is not empty)
                currentBI the first element in types
                xsdType = cache.findMatchingXsdType (currentBI)
                        create a map entry for currentBI and xsdType for each element in currentBI {
                        xsdElement = cache.findMatchingXsdElement (element)
                        create a map entry for element and xsdElement
                        add business item representing this element to types
                }
                remove currentBI from types
        }
```

Fig. 4

HIGH PERFORMANCE MAP EDITOR FOR BUSINESS ANALYSTS

BACKGROUND

This invention relates to apparatus and methods for implementing a business process map editor for business analysts.

Modern business processes are often quite complex, which can make change difficult. Nevertheless, to maintain profitability and competiveness in today's marketplace, businesses need to be able to change quickly to take advantage of market opportunities, innovations, expansions, acquisitions, and partnerships with other businesses. To achieve such change, businesses need to have a comprehensive understanding of their internal business structures, including their internal business processes, rules, data, and transformations. This need for understanding is driving the growth of technologies such as business process modeling (BPM).

Business process modeling (BPM) generally refers to the activity of representing the processes of a business so that the processes can be analyzed and improved. BPM is typically performed by business analysts and managers who are seeking to improve process efficiency and quality. The process improvements identified by BPM may or may not require the involvement of information technology (IT), although this is often the impetus for modeling a business process.

To perform BPM within an organization, various tools have been developed. For example, the Websphere Business Modeler map editor provides a tool for business analysts to define transforms that map input data into output data. The Websphere Business Modeler map editor version 6.2 and older provides a simple map editor with very few functions. These functions are typically inadequate and limit business users from creating more complex mappings.

In view of the foregoing, what is needed is a BPM map editor that provides a richer set of functions for mapping input data into output data. Ideally, such a map editor would be able to leverage the functionality already present in IT-based mapping tools which allow more complex mappings to be defined. This would also minimize the duplication of effort associated with developing business-analyst-based tools and IT-based tools separately.

BRIEF SUMMARY

The invention has been developed in response to the present state of the art and, in particular, in response to the problems and needs in the art that have not yet been fully solved by currently available systems and methods. Accordingly, the invention has been developed to provide systems and methods for implementing feature-rich BPM map editors for business analysts. The features and advantages of the invention will become more fully apparent from the following description and appended claims, or may be learned by practice of the invention as set forth hereinafter.

Consistent with the foregoing, a method for implementing a map editor for business analysts is disclosed herein. In one embodiment, such a method includes receiving a business object model including at least one business object. The business object model is transformed into an XSD-based model including at least one XML schema. The XSD-based model is then fed into an XML mapping infrastructure for model map processing. After processing, the XSD-based model is transformed into a resulting business object model. The resulting business object model may then be displayed for use by a business analyst.

A corresponding computer program product and system are also disclosed and claimed herein.

BRIEF DESCRIPTION OF THE SEVERAL VIEWS OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 4 is pseudo code showing possible operation of a map table builder in accordance with the invention;

DETAILED DESCRIPTION

Figure 1:
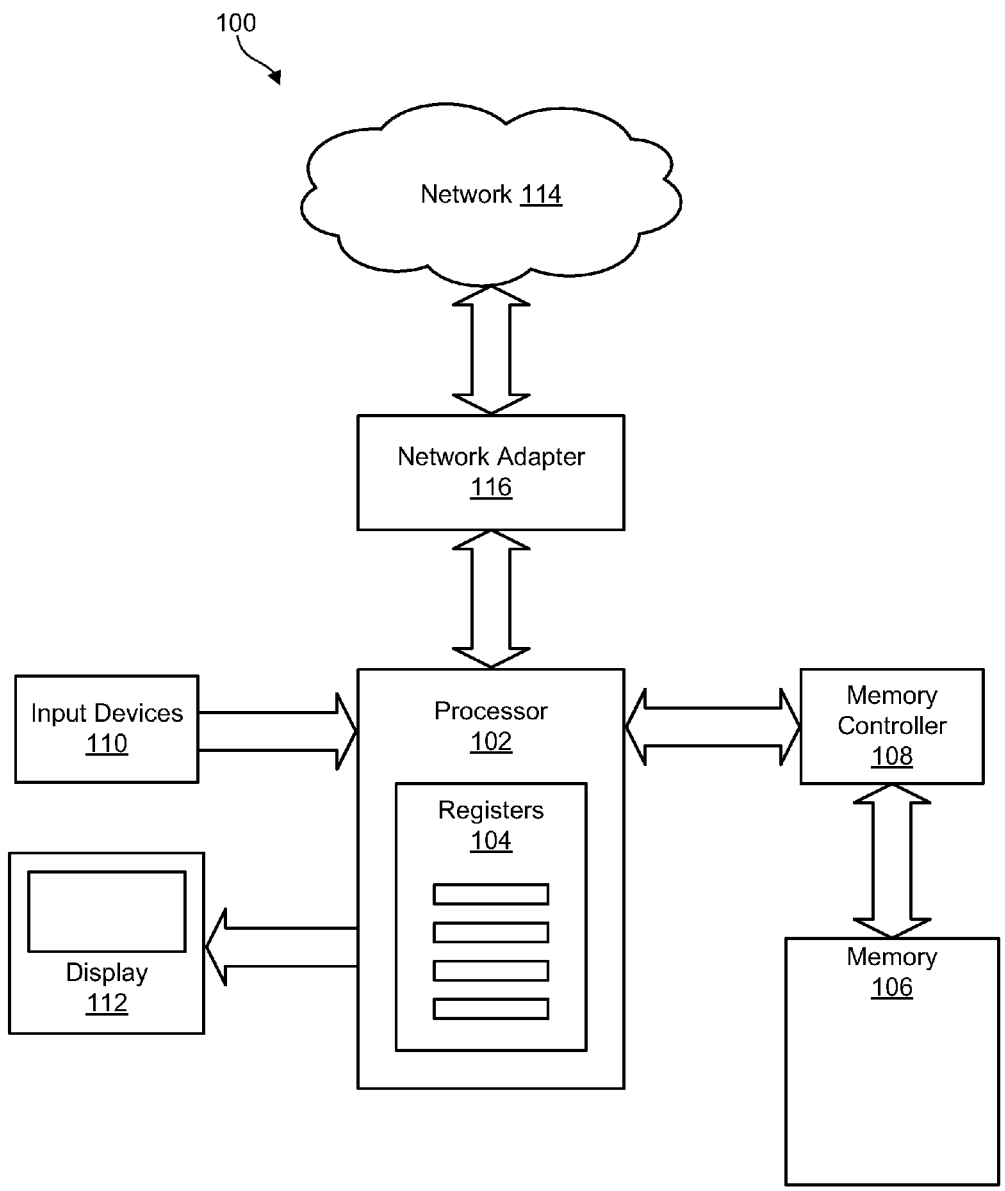
FIG. 1 is a high-level block diagram showing one example of a computer system to implement an improved map editor in accordance with the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java™, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, may be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a computer system 100 is illustrated. The computer system 100 is presented to show one example of an environment where an improved map editor in accordance with the invention may be implemented. The computer system 100 is presented only by way of example and is not intended to be limiting. Indeed, the map editor disclosed herein may be implemented on a wide variety of different computer systems in addition to the computer system 100 shown. The map editor disclosed herein may also potentially be distributed across multiple computer systems 100.

The computer system 100 includes at least one processor 102 and may include more than one processor. The processor 102 includes one or more registers 104 storing data describing the state of the processor and facilitating execution of software systems. The registers 104 may be internal to the processor 102 or may be stored in a memory 106. The memory 106 stores operational and executable data that is operated upon by the processor 102. The memory 106 may be accessed by the processor 102 by means of a memory controller 108. The memory 106 may include volatile memory (e.g., RAM) as well as non-volatile memory (e.g., ROM, EPROM, EEPROM, hard disks, flash memory, etc.).

The processor 102 may be coupled to additional devices supporting execution of software and interaction with users. For example, the processor 102 may be coupled to one or more input devices 110, such as a mouse, keyboard, touch screen, microphone, or the like. The processor 102 may also be coupled to one or more output devices such as a display device 112, speaker, or the like. The processor 102 may communicate with one or more other computer systems by means of a network 114, such as a LAN, WAN, or the Internet. Communication over the network 114 may be facilitated by a network adapter 116.

Figure 2:
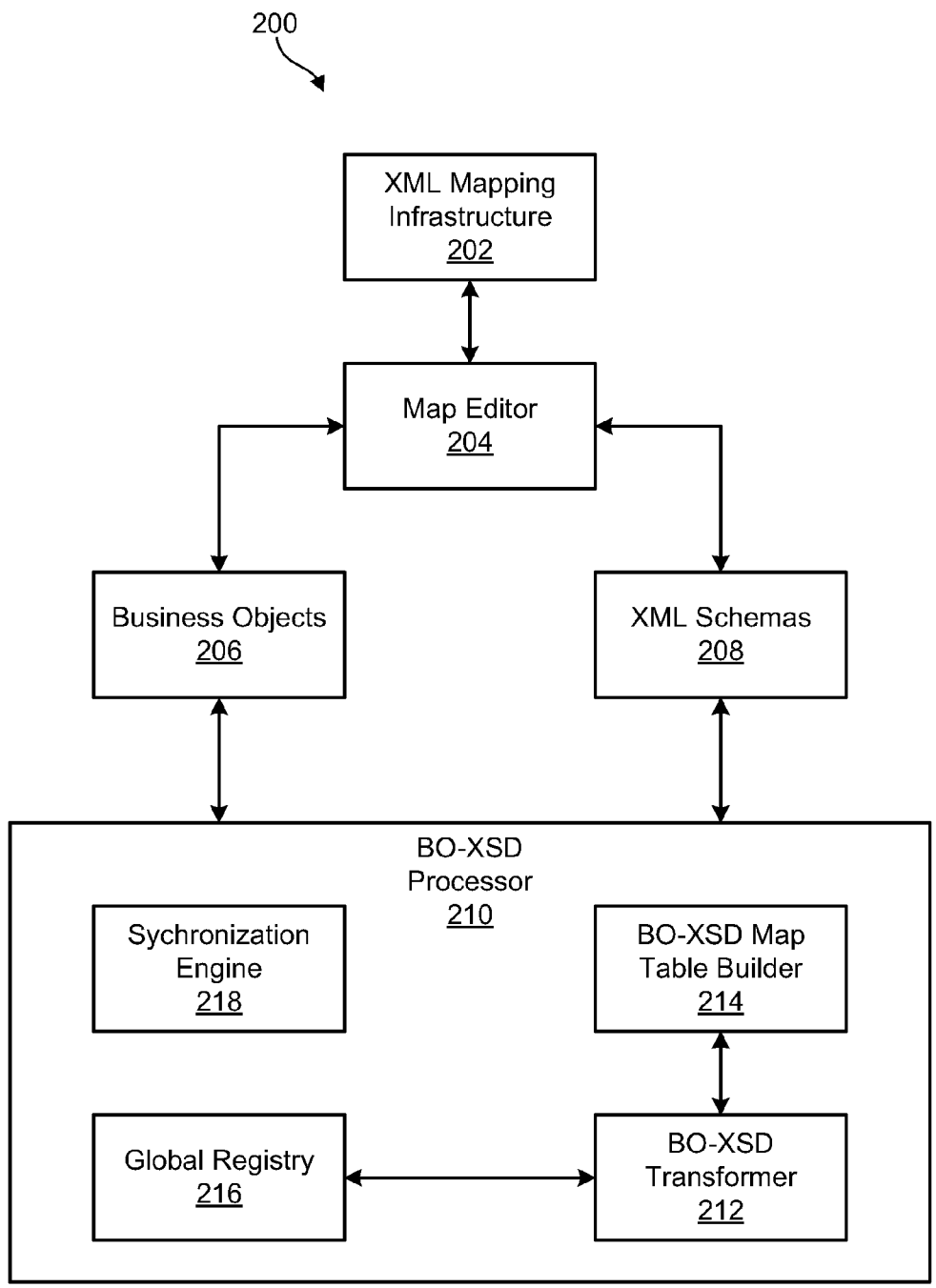
FIG. 2 is a high-level block diagram showing various components of a map editor in accordance with the invention.

Referring to FIG. 2, a high-level block diagram showing one example of a system 200 for implementing a map editor is illustrated. As previously mentioned, some business-analyst tools, such as Websphere Business Modeler map editor version 6.2 and older, provide simple map editors with very few functions. These functions are typically inadequate and limit business users from creating more complex mappings. On the other hand, various IT-based tools, such as the XML map editor from Websphere Integration Developer, are complex tools that provide a much richer set of functions for mapping input data into output data. The XML map editor from Websphere Integration Developer in particular includes an underlying XML mapping infrastructure that enables developers to extend and reuse functionalities for mapping.

The systems and methods disclosed herein use an XML mapping infrastructure, such as that used in Websphere Integration Developer or another XML mapping product, to produce a map editor suitable for business analysts. This provides several potential advantages: First, the map editor may inherit a much richer set of functions provided by the XML mapping infrastructure. This in turn enables more complex mappings to be defined. Second, using the same underlying XML mapping infrastructure to implement both a business-analyst tool and an IT-based tool may avoid duplication and reduce production costs for both tools.

The problems associated with using an XML mapping infrastructure to implement a map editor for business analysts, which are solved by the present disclosure, include: First, the XML mapping infrastructure presents input and output data in an undesirable format. In particular, the XML mapping infrastructure is an IT-based tool that presents data in the form of XML schemas (XSDs). These XML schemas may be inappropriate for business-oriented users as they may contain unfamiliar terminology and formatting. To overcome this problem, a processor is provided to convert XML schemas into a format that is more appropriate for business analysts. The details of this processor will be described in more detail hereafter. Second, the XML mapping infrastructure only accepts inputs and outputs described in terms of XML schemas. A business-analyst tool, on the other hand, needs to operate on business objects, such as those conforming to the Business Object Model (BOM model)—an IBM proprietary format. To utilize the XML mapping infrastructure, these business objects are converted into XML schemas. Although converting artifacts from one form to another can create undesirable performance impacts, various mechanisms may be employed to minimize these impacts. These mechanisms will be discussed in more detail hereafter.

FIG. 2 shows one embodiment of a system 200 for implementing a map editor in accordance with the invention. As shown, a map editor 204 interfaces with an XML mapping infrastructure 202 and a BO-XSD processor 210 to convert artifacts from one form to another. In operation, when an input or output business object is added to a business process model, the XML mapping infrastructure 202 delegates the task to the map editor 204 to locate and load the corresponding XML schema (XSD) for that input or output. Given the business object (BO) 206, the map editor 204 requests a corresponding XML schema 208 from the BO-XSD processor 210. The XML schema 208 is then returned back to the XML mapping infrastructure 202 for further map model processing. For presentation, the XML mapping infrastructure 202 again requests data from the map editor 204 for displaying labels and icons that are appropriate for a business analyst. More specifically, given an XML schema 208, the map editor 204 retrieves the corresponding business object 206 from the processor 210. The map editor 204 then returns the appropriate data back to the XML mapping infrastructure 202 for display.

Figure 3:
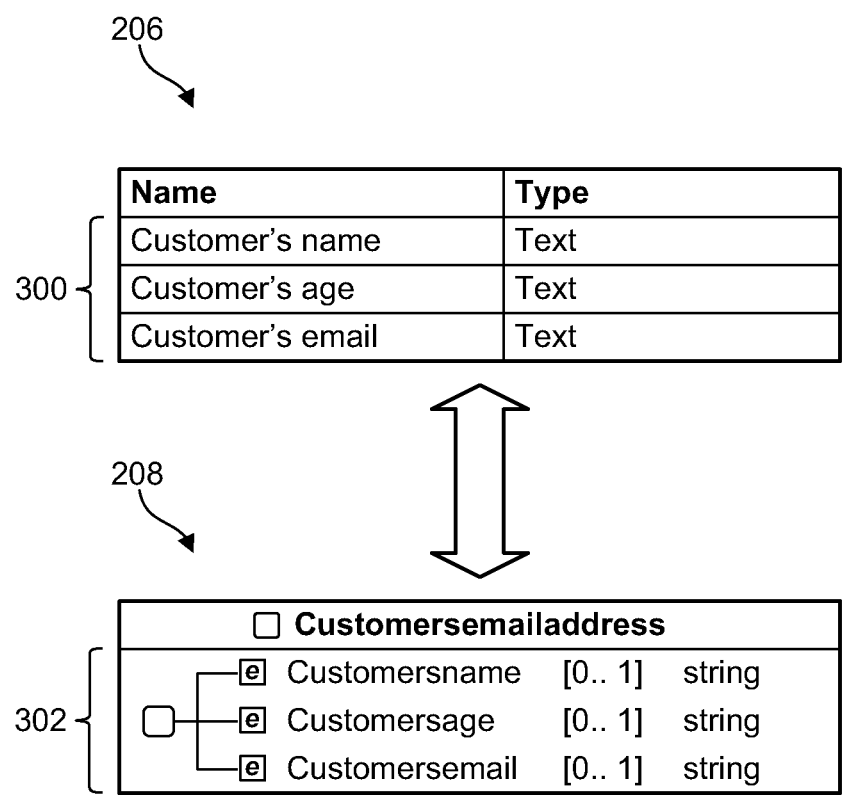
FIG. 3 is a block diagram showing a transformation between a BOM business object and an XML schema.

In selected embodiments, the BO-XSD processor 210 includes four main components: a BO-XSD transformer 212, a BO-XSD map table builder 214, a global registry 216, and a synchronization engine 218. The BO-XSD transformer 212 is configured to transform business objects 206 into XML schemas 208 and vice versa. FIG. 3 shows one example of a transformation between a business object 206 and an XML schema 208. As shown, the business object 206 may include elements 300 that are easy to read and understand for typical business analysts, who may not have a background in programming or information technology. The XML schema 208, on the other hand, may be tailored to the programmer or IT professional. For example the schema name (i.e., Customersemailaddress) and element names 302 (i.e., "Customersname," "Customersage," etc.) are not as readable and the business analyst may be unfamiliar with data types such as "string." The BO-XSD transformer 212 processes the result of the transformation by identifying and mapping each generated element in the schema to each corresponding element in the business object. The result is then cached and passed on to the BO-XSD map table builder 214.

Using the cached information received from the BO-XSD transformer 212, the BO-XSD map table builder 214 recursively builds map tables that enable navigation between elements in the business object and corresponding elements in the XML schema. FIG. 4 shows one embodiment of an algorithm (written in pseudocode) for building such a map table. In general, the algorithm walks through each element in a business object (referred to as a "business item" in the pseudocode) and finds the corresponding element in the XML schema generated by the BO-XSD transformer 212. The algorithm stores the relationship between the elements in a mapping table. The algorithm continues this process for each element in the business object until all corresponding relationships are found. Among other benefits, this mapping allows a user to easily toggle between a business object model and a corresponding XSD-based model, as will be explained in more detail in association with FIGS. 6 and 7.

The map tables produced by the map table builder 214 may be stored in a global registry 216, acting as a cache, maintained by the BO-XSD processor 210. When the processor 210 receives a request from the map editor 204 for an XML schema 208 associated with a business object, the processor 210 may initially check the global registry 216 for an existing XML schema 208. If the desired XML schema 208 is found, the processor 210 will return the XML schema 208 instead of invoking the BO-XSD transformer 212 to build a new one. This improves the performance of the map editor 204 and reduces the need to convert artifacts from one form to another.

In selected embodiments, the XML schemas stored in the global registry 216 are accessible by multiple map editors 204, each of which may include different maps referencing the same business object. In such embodiments, the processor 210 may keep track of which editors 204 are currently referencing the same business object and thus the same XML schema in the global registry 216. If no editor 204 references a particular XML schema in the global registry 216, the processor 210 may deregister the XML schema (e.g., delete the XML schema) to free up memory. In other embodiments, the processor 210 retains the XML schema in the global registry 216 for a specified amount of time after it is no longer referenced by any editor 204, or the processor 210 waits for specific instructions to deregister the XML schema.

In selected embodiments, the generated XML schemas and mapping information are used not only by the map editor 204, but also by a simulation framework (not shown). The simulation framework may use the mapping information from the BO-XSD map table builder 214 to populate data in XML documents generated from the XML schemas. To perform a simulation, a simulation global registry (not shown) containing the populated XML documents may be created. In certain embodiments, the simulation global registry is cleaned up after the simulation is performed.

Figure 5:
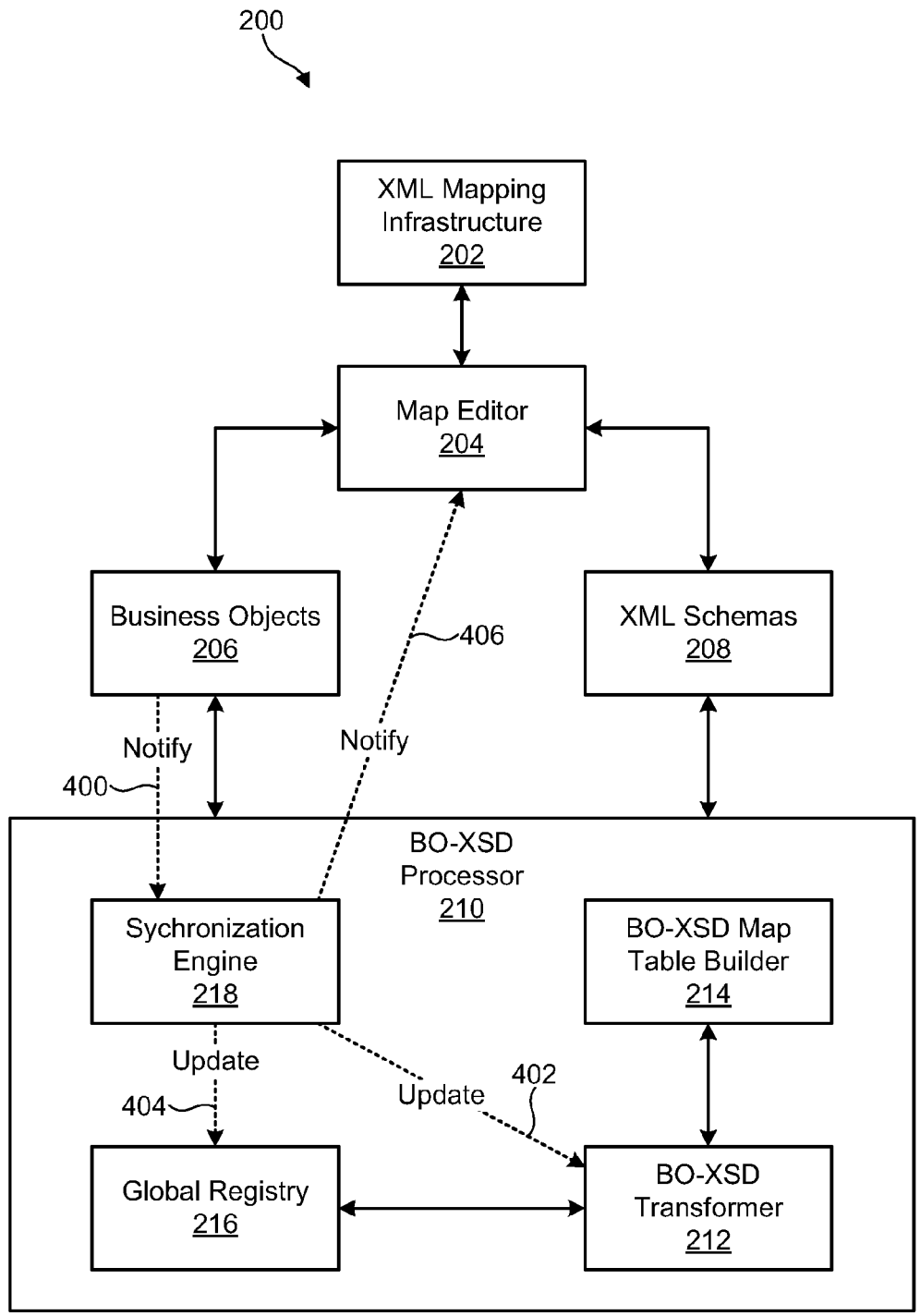
FIG. 5 is a high-level block diagram showing the operation of the synchronization engine.

Referring to FIG. 5, as mentioned above, the BO-XSD processor 210 may also include a synchronization engine 218 to keep business objects and corresponding XML schemas synchronized. When modeling a business process in the map editor 204, a business object may be modified at any time. The synchronization engine 218 ensures that the XML schemas in the global registry 216 are up-to-date and in sync with the corresponding business objects. In selected embodiments, the XML schemas are updated incrementally to improve performance. Such incremental updates may only update the parts of the XML schema that are affected by changes to a business object, as opposed to regenerating the XML schema in its entirety. In other embodiments, an XML schema is regenerated in its entirety each time any part of a corresponding business object changes, or if enough of the corresponding business object has changed to warrant a complete regeneration.

In selected embodiments, the synchronization engine 218 is registered as an adapter of a business object model. This will enable the synchronization engine 218 to be notified whenever a business object in the business object model changes (as indicated by the arrow 400). Upon detecting such a change, the synchronization engine 218 may determine whether a full or incremental update is needed for the corresponding XML schema. The synchronization engine 218 may then invoke the BO-XSD transformer 212 to make the change to the corresponding XML schema (as indicated by the arrow 402) and update the global registry 216 to reflect the change (as indicated by the arrow 404). The synchronization engine 218 may also notify the map editor 204 of the change (as indicated by the arrow 406) so that the editor 204 can refresh the presentation of the business object and other parts of the business model that may have changed.

Figure 6:
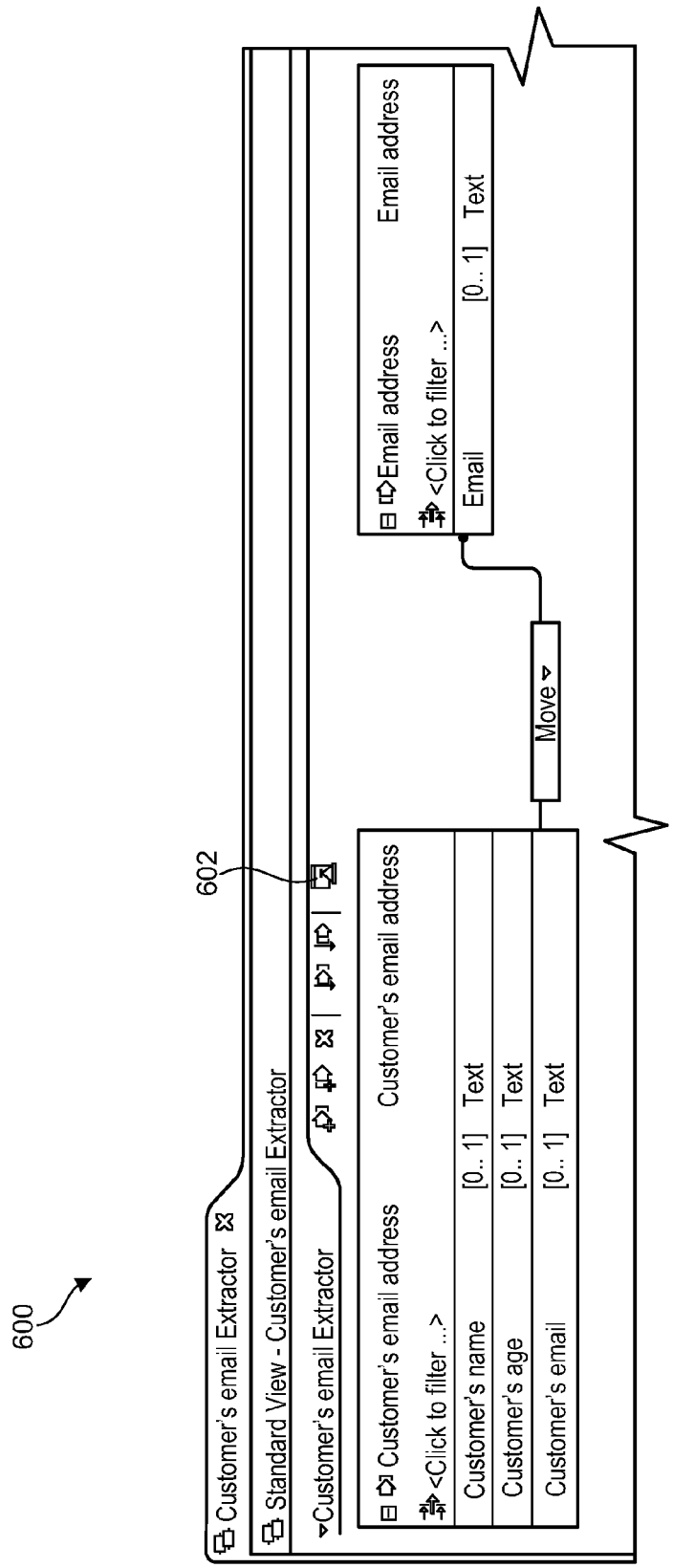
FIG. 6 is a diagram showing one embodiment of a dual-view editor displaying a business object model.
Figure 7:
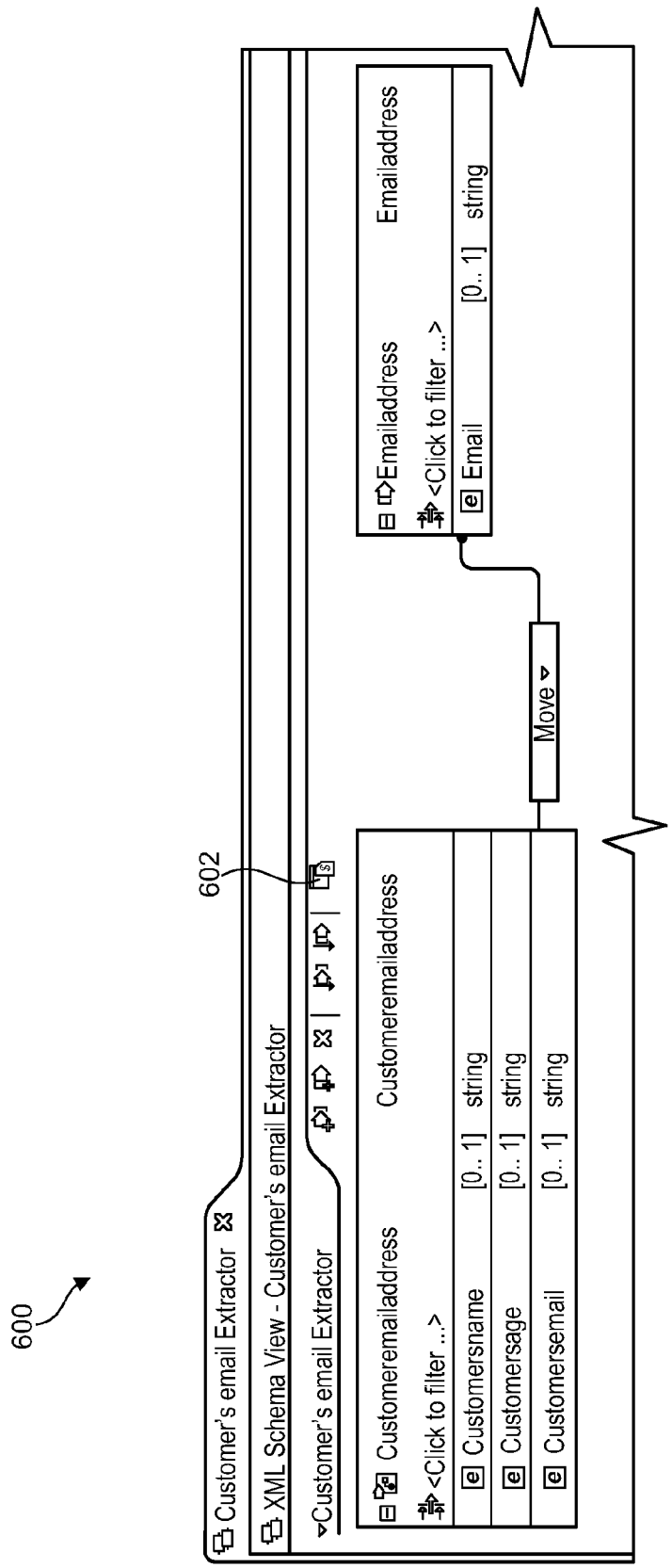
FIG. 7 is a diagram showing one embodiment of a dual-view editor displaying an XSD-based model.

Referring to FIGS. 6 and 7, in selected embodiments, the operation of the BO-XSD processor 210 enables the creation of a dual-view editor 600. This dual-view editor 600 may enable a user to toggle between a view of the business object model and the XSD-based model. FIG. 6 shows one example of the dual-view editor 600 displaying a business object model. This view would be appropriate for non-technical business users. FIG. 7 shows one example of the dual-view editor 600 displaying an XSD-based model associated with the business object model. This view would be appropriate for technical personnel, such as IT professionals or advanced users. A button 602 may be provided in either view to allow a user to toggle between the different views.

In selected embodiments, the dual-view editor 600 allows editing of either the business object model or the XSD-based model in their respective views. When changes are made to the business object model, the BO-XSD processor 210 makes corresponding changes to the XSD-based model. Similarly, when changes are made to the XSD-based model, the BO-XSD processor 210 makes corresponding changes to the business object model. In this way, the BO-XSD processor 210 keeps the two models synchronized.

To view the business object model in the map editor 204, the map editor 204 may retrieve the corresponding business object for each XML schema in the model from the BO-XSD processor 210. Using the returned business objects, the map editor 204 may then display the data and labels that are appropriate for business users. To view the XML schema model in the map editor 204, the editor 204 is effectively turned into an XML map editor 204. In such a case, the editor 204 delegates the displaying task back to XML mapping infrastructure 202.

The blocks illustrated in FIGS. 1, 2, and 5 may be implemented in the form of one or more modules. Such modules may be implemented in hardware, software or firmware executable on hardware, or a combination thereof. The modules are presented only by way of example and are not intended to be limiting. Indeed, alternative embodiments may include more or fewer modules than those illustrated. It should also be recognized that, in some embodiments, the functionality of some modules may be broken into multiple modules or, conversely, the functionality of several modules may be combined into a single module or fewer modules. It should also be recognized that the modules are not necessarily implemented in the locations where they are illustrated. For example, some functionality shown in the BO-XSD processor 210 may be implemented in other locations or as stand-alone modules. Thus, the location of the modules is presented only by way of example and is not intended to be limiting.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Some blocks may be deleted or other blocks may be added depending on the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

What is claimed is:

1. A computer-implemented method, comprising:
building at least one model synchronization map table that facilitates navigation between elements of business objects of a business object model and corresponding elements of an extensible markup language (XML) schema definition-based (XSD-based) model comprising at least one XML schema and generated from the business object model, comprising recursively building the at least one model synchronization map table with stored relationships between each identified element of the at least one XML schema of the XSD-based model and a respective corresponding element of each business object of the business object model, where the stored relationships within the model synchronization map table facilitate toggling and automatic synchronization between the business object model and the XSD-based model;
displaying the business object model and the XSD-based model in a dual-view editor, the dual-view editor enabling a user to toggle between and independently edit the business object model and the XSD-based model; and
automatically synchronizing, using the at least one model synchronization map table, the elements of the business objects of the business object model with the corresponding elements of the XSD-based model in response to independent edits made to one of the XSD-based model and the business object model within the dual-view editor.

2. The computer-implemented method of claim 1, where displaying the business object model and the XSD-based model in the dual-view editor comprises delegating the displaying of the business object model and the XSD-based model in the dual-view editor to an XML mapping infrastructure.

3. The computer-implemented method of claim 1, where automatically synchronizing, using the at least one model synchronization map table, the elements of the business objects of the business object model with the corresponding elements of the XSD-based model in response to the independent edits made to the one of the XSD-based model and the business object model within the dual-view editor comprises:
incrementally synchronizing the elements of the business objects of the business object model with the corresponding elements of the XSD-based model in response to each independent edit made to the one of the XSD-based model and the business object model within the dual-view editor.

4. The computer-implemented method of claim 1, further comprising registering the automated synchronization of the elements of the business objects of the business object model with the corresponding elements of the XSD-based model as an adapter of the business object model.

5. The computer-implemented method of claim 4, further comprising:
receiving, responsive to an independent edit made to the business object model within the dual-view editor, a notification from the adapter of the business object model;

invoking an incremental transformation of the corresponding XML schema; and refreshing the displayed XSD-based model to reflect the incremental transformation of the corresponding XML schema.

6. The computer-implemented method of claim 5, further comprising updating a global registry with the incremental transformation of the corresponding XML schema.

7. A system, comprising:
a memory; and
a processor programmed to:
build, within the memory, at least one model synchronization map table that facilitates navigation between elements of business objects of a business object model and corresponding elements of an extensible markup language (XML) schema definition-based (XSD-based) model comprising at least one XML schema and generated from the business object model, comprising the processor being programmed to recursively build the at least one model synchronization map table with stored relationships between each identified element of the at least one XML schema of the XSD-based model and a respective corresponding element of each business object of the business object model, where the stored relationships within the model synchronization map table facilitate toggling and automatic synchronization between the business object model and the XSD-based model;
display the business object model and the XSD-based model in a dual-view editor, the dual-view editor enabling a user to toggle between and independently edit the business object model and the XSD-based model; and
automatically synchronize, using the at least one model synchronization map table, the elements of the business objects of the business object model with the corresponding elements of the XSD-based model in response to independent edits made to one of the XSD-based model and the business object model within the dual-view editor.

8. The system of claim 7, where, in being programmed to display the business object model and the XSD-based model in the dual-view editor, the processor is programmed to delegate the displaying of the business object model and the XSD-based model in the dual-view editor to an XML mapping infrastructure.

9. The system of claim 7, where, in being programmed to automatically synchronize, using the at least one model synchronization map table, the elements of the business objects of the business object model with the corresponding elements of the XSD-based model in response to the independent edits made to the one of the XSD-based model and the business object model within the dual-view editor, the processor is programmed to:
incrementally synchronize the elements of the business objects of the business object model with the corresponding elements of the XSD-based model in response to each independent edit made to the one of the XSD-based model and the business object model within the dual-view editor.

10. The system of claim 7, where the processor is further programmed to register the automated synchronization of the elements of the business objects of the business object model with the corresponding elements of the XSD-based model as an adapter of the business object model.

11. The system of claim 10, where the processor is further programmed to:
receive, responsive to an independent edit made to the business object model within the dual-view editor, a notification from the adapter of the business object model;
invoke an incremental transformation of the corresponding XML schema;
refresh the displayed XSD-based model to reflect the incremental transformation of the corresponding XML schema; and
update a global registry with the incremental transformation of the corresponding XML schema.

12. A computer program product comprising a computer-usable storage medium having computer-usable program code embodied therein, where the computer-usable storage medium is not a transitory signal per se and the computer-usable program code when executed on a computer causes the computer to:
build at least one model synchronization map table that facilitates navigation between elements of business objects of a business object model and corresponding elements of an extensible markup language (XML) schema definition-based (XSD-based) model comprising at least one XML schema and generated from the business object model, where the computer-usable program code when executed on the computer causes the computer to recursively build the at least one model synchronization map table with stored relationships between each identified element of the at least one XML schema of the XSD-based model and a respective corresponding element of each business object of the business object model, where the stored relationships within the model synchronization map table facilitate toggling and automatic synchronization between the business object model and the XSD-based model;
display the business object model and the XSD-based model in a dual-view editor, the dual-view editor enabling a user to toggle between and independently edit the business object model and the XSD-based model; and
automatically synchronize, using the at least one model synchronization map table, the elements of the business objects of the business object model with the corresponding elements of the XSD-based model in response to independent edits made to one of the XSD-based model and the business object model within the dual-view editor.

13. The computer program product of claim 12, where, in causing the computer to display the business object model and the XSD-based model in the dual-view editor, the computer-usable program code when executed on the computer causes the computer to delegate the displaying of the business object model and the XSD-based model in the dual-view editor to an XML mapping infrastructure.

14. The computer program product of claim 12, where, in causing the computer to automatically synchronize, using the at least one model synchronization map table, the elements of the business objects of the business object model with the corresponding elements of the XSD-based model in response to the independent edits made to the one of the XSD-based model and the business object model within the dual-view editor, the computer-usable program code when executed on the computer causes the computer to:
incrementally synchronize the elements of the business objects of the business object model with the corresponding elements of the XSD-based model in response to each independent edit made to the one of the XSD-based model and the business object model within the dual-view editor.

15. The computer program product of claim 12, where the computer-usable program code when executed on the computer further causes the computer to register the automated synchronization of the elements of the business objects of the business object model with the corresponding elements of the XSD-based model as an adapter of the business object model.

16. The computer program product of claim 15, where the computer-usable program code when executed on the computer further causes the computer to:
   receive, responsive to an independent edit made to the business object model within the dual-view editor, a notification from the adapter of the business object model;
   invoke an incremental transformation of the corresponding XML schema; and
   refresh the displayed XSD-based model to reflect the incremental transformation of the corresponding XML schema.

17. The computer program product of claim 16, where the computer-usable program code when executed on the computer further causes the computer to update a global registry with the incremental transformation of the corresponding XML schema.

* * * * *